(12) United States Patent
Thomas et al.

(10) Patent No.: US 10,989,243 B2
(45) Date of Patent: Apr. 27, 2021

(54) DOUBLY-SEPARATING EXPLOSIVELY RELEASABLE BOLT

(71) Applicants: Myron L. Thomas, King George, VA (US); Seth Leland Williamson, King George, VA (US); Joshua Geiger Clarke, Ashland, VA (US); Logan M. Compton, Fredericksburg, VA (US)

(72) Inventors: Myron L. Thomas, King George, VA (US); Seth Leland Williamson, King George, VA (US); Joshua Geiger Clarke, Ashland, VA (US); Logan M. Compton, Fredericksburg, VA (US)

(73) Assignee: United States of America, as represented by the Secretary of the Navy, Arlington, VA (US)

( * ) Notice: Subject to any disclaimer, the term of this patent is extended or adjusted under 35 U.S.C. 154(b) by 165 days.

(21) Appl. No.: 16/362,967

(22) Filed: Mar. 25, 2019

(65) Prior Publication Data
US 2020/0309183 A1 Oct. 1, 2020

(51) Int. Cl.
*F16B 31/00* (2006.01)

(52) U.S. Cl.
CPC ............ *F16B 31/005* (2013.01); *F16B 31/00* (2013.01)

(58) Field of Classification Search
CPC ...... F16B 5/0275; F16B 5/0283; F16B 19/12; F16B 19/125; F16B 19/14; F16B 31/005; F16B 31/00; F42B 3/006; E21D 21/002
USPC ...................... 411/19–20, 289, 390, 391, 440
See application file for complete search history.

(56) References Cited

U.S. PATENT DOCUMENTS

| 2,268,211 | A | | 12/1941 | Hathorn ............................. 24/19 |
| 2,541,205 | A | * | 2/1951 | Christophersen ....... F16L 23/08 285/210 |
| 2,585,870 | A | * | 2/1952 | Spielman ................. B64D 1/02 89/1.57 |
| 2,679,783 | A | * | 6/1954 | Smith ..................... F42B 3/006 411/367 |
| 2,690,122 | A | * | 9/1954 | Darnall, Jr. ............. F42B 12/58 102/393 |

(Continued)

OTHER PUBLICATIONS

GD-ED-2214 Marman Clamp System Design Guidelines, Goddard Space Flight Ctr. 2000, https://upload.wikimedia.org/wikipedia/commons/e/ee/Guideline_No._GD-Ed-2214_Marman_Clamp_Systems_Design_Guidelines.pdf.

(Continued)

*Primary Examiner* — Roberta S Delisle
(74) *Attorney, Agent, or Firm* — Gerhard W. Thielman

(57) ABSTRACT

An explosive bolt is provided for securing a brace in tension. The bolt includes a bar, a pair of explosives, a pair of detonators and a pair of anchors. The bar has opposing longitudinal ends and an outer thickness. Opposing bores extend inwardly from the longitudinal ends to corresponding depth ends. First and second notches reduce the thickness proximate to the corresponding depth ends. A center rod separates the notches from each other. Each explosive correspondingly inserts into a corresponding bore to a corresponding depth end. Each detonator correspondingly inserts into the corresponding bore. Each anchor secures the bar to the brace. In further embodiments, the longitudinal ends include helical male threads, and the anchors are nuts having helical female threads.

12 Claims, 3 Drawing Sheets

(56) References Cited

U.S. PATENT DOCUMENTS

| | | | | |
|---|---|---|---|---|
| 2,895,756 | A * | 7/1959 | Gair | F16B 7/06 |
| | | | | 403/343 |
| 2,955,340 | A | 10/1960 | Zartler | 24/279 |
| 3,012,810 | A * | 12/1961 | Tenney | F42B 3/006 |
| | | | | 294/82.29 |
| 3,087,369 | A * | 4/1963 | Butterfield | F16B 31/005 |
| | | | | 411/391 |
| 3,089,387 | A * | 5/1963 | Damm | F42B 3/006 |
| | | | | 89/1.51 |
| 3,109,216 | A * | 11/1963 | Brown | F42B 3/006 |
| | | | | 24/279 |
| 3,157,932 | A * | 11/1964 | Kyrias | F16L 33/12 |
| | | | | 24/271 |
| 3,237,521 | A * | 3/1966 | Gus | F42B 3/006 |
| | | | | 89/1.1 |
| 3,277,766 | A | 10/1966 | Burkdoll | 85/1 |
| 3,744,825 | A | 7/1973 | Cooper et al. | 285/407 |
| 3,888,158 | A * | 6/1975 | Temple | F42B 3/006 |
| | | | | 89/1.14 |
| 3,964,773 | A | 6/1976 | Stade et al. | 285/367 |
| 4,283,987 | A * | 8/1981 | Stichling | B01J 3/002 |
| | | | | 89/1.14 |
| 4,669,354 | A * | 6/1987 | Lucy | F42B 3/006 |
| | | | | 60/634 |
| 5,226,617 | A | 7/1993 | Panin | 244/158 |
| 5,454,606 | A | 10/1995 | Voss et al. | 285/367 |
| 5,474,408 | A * | 12/1995 | Dinitz | F16B 31/021 |
| | | | | 256/13.1 |
| 6,076,467 | A * | 6/2000 | Cespedosa | B64G 1/641 |
| | | | | 102/377 |
| 9,624,953 | B2 * | 4/2017 | Veilleraud | F16B 11/006 |
| 2007/0080260 | A1 * | 4/2007 | Lancho Doncel | B64G 1/641 |
| | | | | 244/173.1 |
| 2015/0059905 | A1 | 3/2015 | Jones et al. | F16L 19/065 |
| 2016/0102689 | A1 | 4/2016 | Madsen et al. | F16B 2/06 |

OTHER PUBLICATIONS

Lazansky, C: "Refinement of a Low-Shock Separation System", Jet Propulsion Laboratory 44$^{th}$ Mechanisms Symposium, 2012. https://esmats.eu/amspapers/pastpapers/pdfs/2012/lazansky.pdf.

Shoghi, K. et al.: "Stress in V-section band clamps", *J. Mech. Engr. Sci.*, 2004. https://scinapse.io/papers/2017375516.

Takeuchii, S. et al.: "Estimation of Separation Shock of the Marman Clamp System . . . ", *Trans. Japan Soc. Aero. Space Sci.*, 45(147) 2002. https://www.jstage.jst.go.jp/article/tjsaxs/45/147/45_147_53/_pdf.

\* cited by examiner

DOUBLY-SEPARATING EXPLOSIVELY RELEASABLE BOLT

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to explosive bolts for component separation. In particular, the invention relates to an explosive bolt having integral redundancy for improved reliability in separation of a clamp in tension.

Explosively-releasable bolts have many uses on space vehicles and staged rocket motor assemblies. Additionally, and of particular interest, explosively releasable bolts are presently utilized to provide longitudinal restraint to encanistered missiles within the Mk41 Vertical Launching System (VLS) on USS Arleigh Burke class DDG and USS Ticonderoga class CG type surface combatants.

Conventional explosively-releasable bolts have a single explosive charge and a single fracture plane. In the event that any portion of the energetic chain reaction (initiation, explosive detonation, material fracture) malfunctions, the explosively releasable bolt fails to separate. In the case of the Mk41 VLS, this results in a costly restrained firing event, wherein the missile's booster burns while the missile is still restrained within the launcher.

SUMMARY

Conventional explosively releasable bolts yield disadvantages addressed by various exemplary embodiments of the present invention. In particular, various exemplary embodiments provide an explosive bolt for securing a brace in tension. The bolt includes a bar, a pair of explosives, a pair of detonators and a pair of anchors.

The bar has opposing longitudinal ends and an outer thickness. Opposing bores extend inwardly from the longitudinal ends to corresponding depth ends. First and second notches reduce the thickness proximate to the corresponding depth ends. A center rod separates the notches from each other, Each explosive correspondingly inserts into a corresponding bore to a corresponding depth end. Each detonator correspondingly inserts into the corresponding bore. Each anchor secures the bar to the brace. In further embodiments, the longitudinal ends include helical male threads, and the anchors are nuts having helical female threads.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

The disclosure generally employs English units with the following abbreviations: length in inches ("), mass in pounds ($lb_m$), and angles in degrees (°). Derivative quantities, such as density, employ a combination of such units.

To reduce the probability of a restrained firing event in the fleet (resulting from a hang-fire), a revised restraint system that incorporates two separate explosively releasable bolts was developed. The stress waves created by the detonation are reflected and concentrated by the precisely-designed geometry of the bolt. These stress waves produce a controlled fracture of the bolt along a pre-determined plane. U.S. Pat. No. 3,277,766 provides further description of such a separation technique. Exemplary embodiments of an explosive bolt are provided as an inventive alternative.

Conventionally, both separate bolts are energized at the time of intended release. The bolts attach to the longitudinal restraint as to release the longitudinal restraint irrespective of whether either one bolt separates or both bolts separate. This mode increases reliability of the system regarding separation. However, the addition of another complete explosively releasable bolt assembly carries a burden in terms of complexity and volume.

The exemplary double-separating explosively releasable bolt functions in the same manner as a conventional "single-separating" explosively releasable bolt, with the primary difference being that the double-separating explosively releasable bolt incorporates two distinct energetic chains and two distinct fracture planes within a single bolt assembly. In brief, for each energetic chain, an electric signal energizes an initiator, which consequently causes detonation of a small explosive charge.

Figure 1:
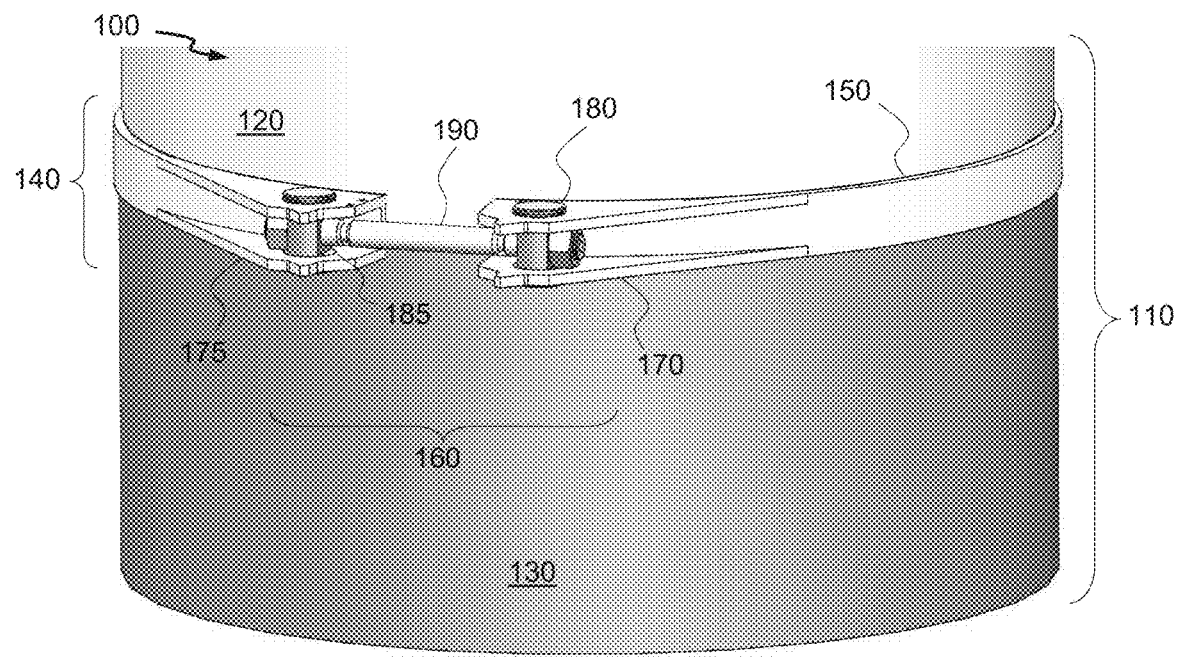
FIG. 1 is an isometric view of a restrained missile.

FIG. 1 shows a perspective view 100 of a restrained missile assembly 110. A missile 120 secures to a support 130 by an exemplary Marman clamp 140. U.S. Pat. Nos. 2,541, 205 and 2,895,756 provide examples of this design based on initial development by Zeppo Marx. A ribbon band 150 wraps around the circumferential joint interface between the missile 120 and its support 130. A tension brace 160 connects terminals of the band 150.

Proximal and distal pairs of flanges 170 and 175 flank the width of the band 150 at either terminal, each flange extending radially outward from the missile 120 and the support 130. A clevis 180 passes through alignment holes 185 in each pair of flanges 170 and 175. The devises 180 are disposed coaxially to the missile 120 and support 130. An exemplary double-separating explosive bolt 190 fastens the opposing devises 180 together in tension to secure the brace 160 together as a locking mechanism.

Upon release of a missile 120, its booster ignites, thereby producing thrust and thereby launch from the support 130. Concurrently, the clamp 140 is commanded to sever its explosive bolt to release the missile 120 from its support 130. Failure of the explosive bolt to separate ends of the clamp 140 causes a restrained booster firing into the support 130, thereby damaging the VLS aboard ship. Conventionally, to approximately double the reliability necessitates providing two separate explosive bolts, with attendant increase in volume and physical complexity.

Figure 2:
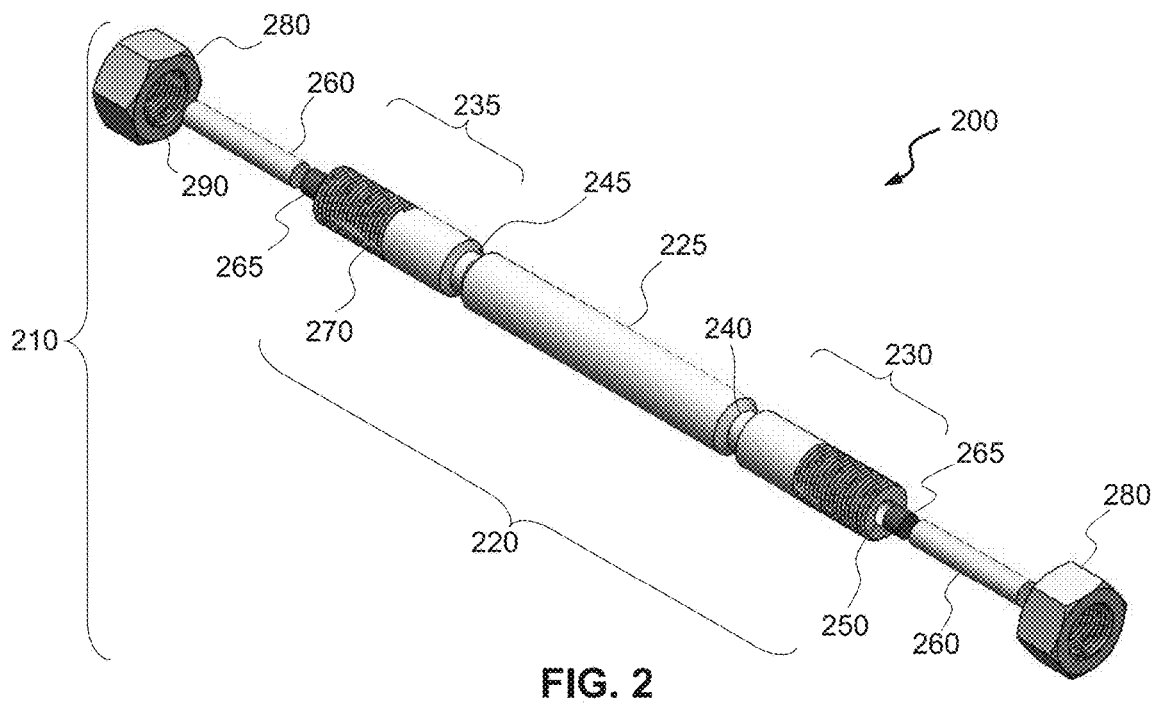
FIG. 2 is an exploded isometric view of components for an exemplary explosive bolt.

FIG. 2 shows an exploded perspective view 200 of components 210 for the exemplary double-separating explosive bolt 190. A notched cylindrical bar 220 includes a center solid rod 225 having a circular cross-section. Proximal and distal housings 230 and 235 flank the longitudinal ends of the rod 225, joined together by corresponding proximal and distal notches 240 and 245. Each housing 230 and 235 includes an axially circular bore 250 from the longitudinal end to the respective notch 240 and 245. The rod 225 and housings 230 and 235 are coaxial, forming a straight axisymmetric bar 220.

An exploding bridge-wire detonator 260 and an associated explosive charge 265 insert into the corresponding bore 250, with the charge 265 being disposed adjacent to its associated notch 240 and 245. A helical male thread 270 begins at the end of each housing 230 and 235 partway towards the rod 225 to receive a threaded nut 280 with corresponding helical female thread 290. The nut 280 secures the bolt 190 to each clevis 180 as an anchor for the bar 220. Although nuts 280 constitute practical and inexpensive fasteners, alternative anchors can also be considered without limiting the invention's scope.

The detonator 260 can constitute a primer, such as lead azide ($Pb(N_3)_2$), lead styphnate ($C_6HN_3O_8Pb$), pentaerythritol tetranitrate (or PETN, $C_5H_8N_4O_{12}$) or other similar initiators. The charge 265 can constitute an explosive such as cyclotrimethylenetrinitramine ($C_3H_6N_6O_6$) called RDX, which detonates in response to shock from the primer. For electrical initiation, the detonator 260 includes bridge wire leads that pass current into the primer, which explodes in response.

Figure 3A:
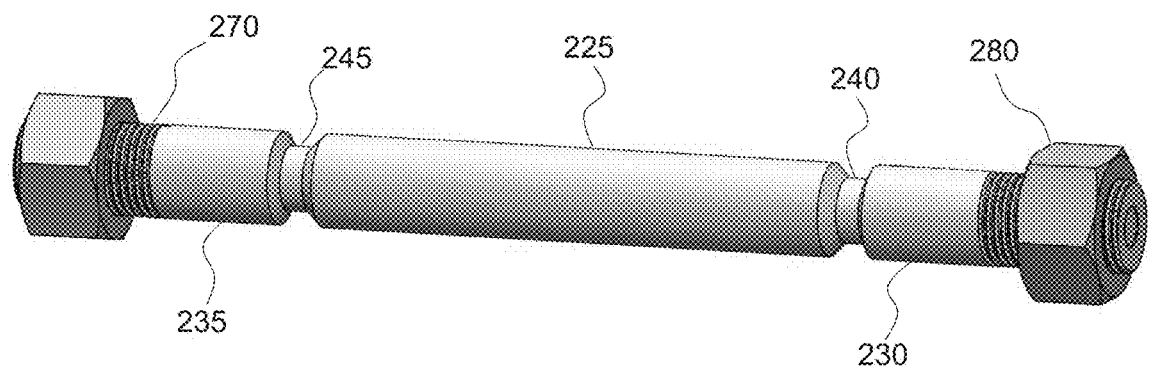
FIGS. 3A and 3B are isometric views of the explosive bolt.
Figure 3B:
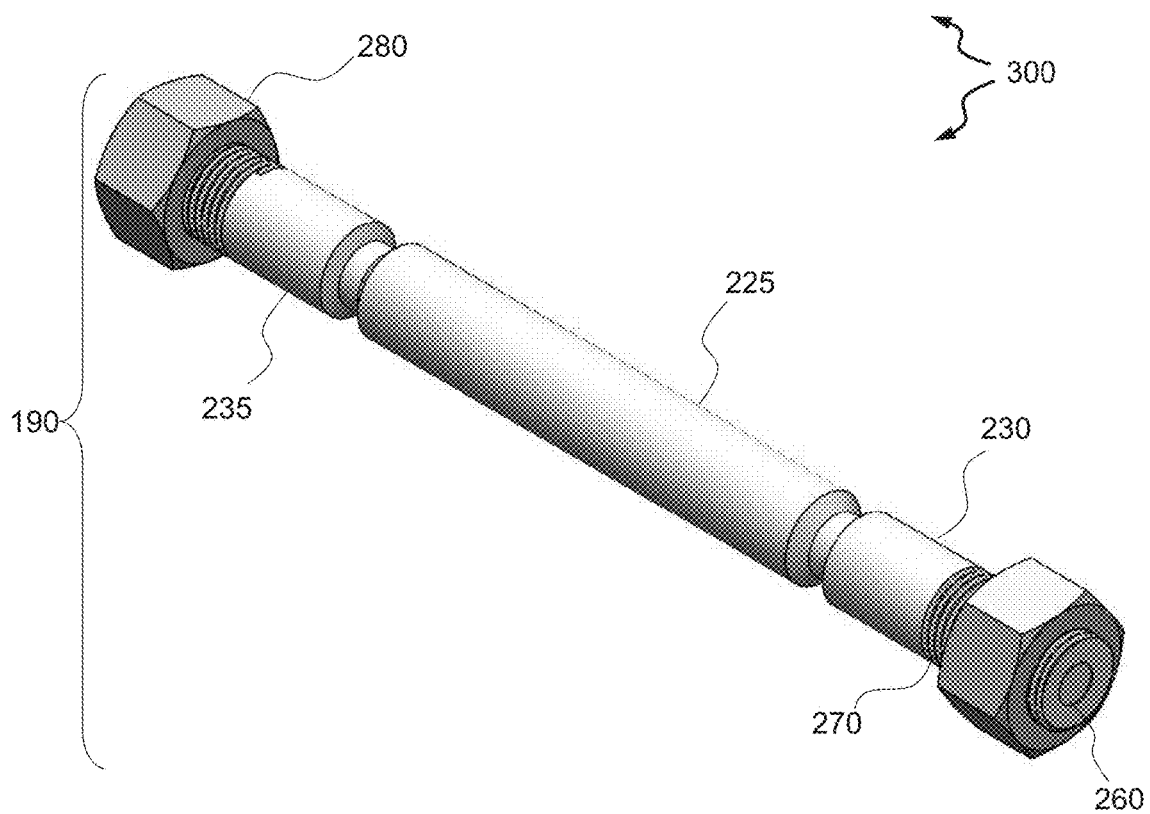

FIGS. 3A and 3B show isometric assembly views 300 of the explosive bolt 190. The nuts 280 are turned over the thread 270 on each extension 230 and 235. The notches 240 and 245 connect the housings 230 and 235 to the rod 225 with the detonator 260 visible from the bore 250.

Figure 4A:
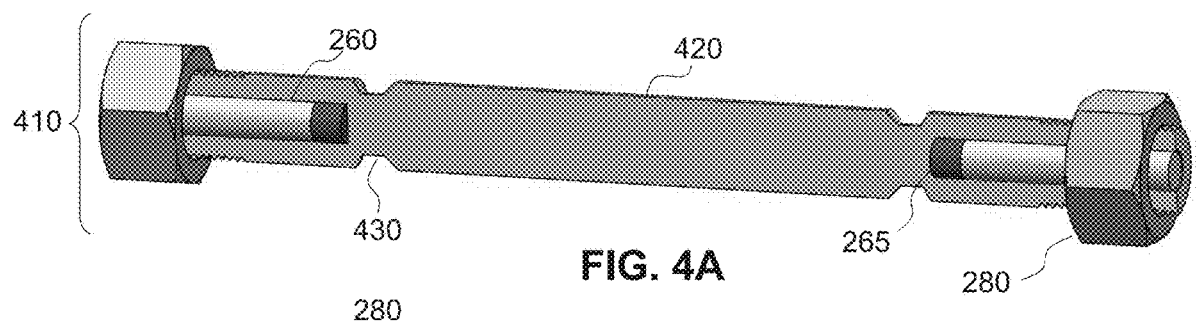
FIGS. 4A and 4B are isometric views of a cutaway bolt.
Figure 4B:

FIGS. 4A and 4B show isometric assembly views 400 of a cutaway explosive bolt assembly 410. A longitudinally sliced pole 420 represents the bar 220 featuring the notches 430. The detonator 260, charge 265 and nut 280 are disposed at each end of the sliced pole 420. The bore 250 extends from the outer extremities of the bar 220 stopping short of the adjacent notch 240 and 245, leaving less solid material for the charge 265 to rupture. Explosion of the charge 265 initiated by the detonator 260 induces sudden stresses at the notches 240 and 245, thereby the bar 220 to fracture at those stress concentrations. Breaking the bar 220 separates the rod 225 from at least one of the housings 230 and 235.

Figure 5:
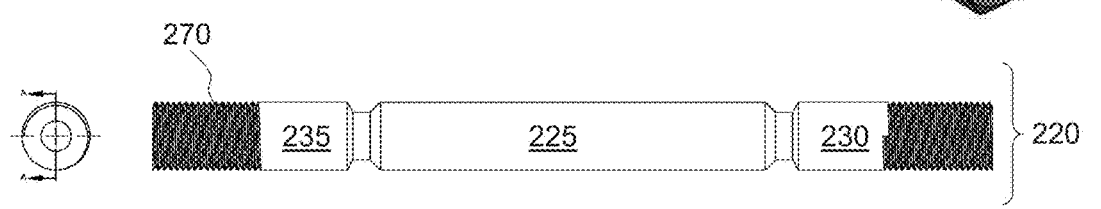
FIG. 5 is a set of elevation views of an exemplary bar.
Figure 5:
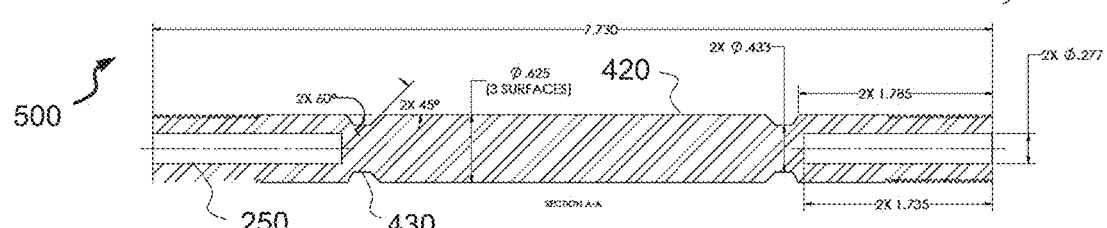

FIG. 5 shows elevation views 500 of the notched bar 220. The upper portion features the rod 225 flanked by proximal housing 230 on the right and the distal housing 235 on the left, both terminated by male threads 270. The lower portion illustrates the cross-section pole 420 with the notch 430 formed by chamfered angles of 45" towards the rod 225 and 60° towards the threads 270. The bar 220 is composed of SAE 17-4 PH® stainless steel (with 0.280 $lb_m/in^3$ density) or similar material with appropriate structural properties.

For operations involving ship-launched missiles 120, exemplary dimensions include total length of 7.730 inches (") with an outer diameter of 0.625 inch for the bar 220. This corresponds to a standard ⅝' nut 280 with 18 threads-per-inch. The housings 230 and 235 have lengths of 1.786 inches with the bore 250 having an inner diameter of 0.277 inch along 1.735 inches. The notch 430 has an outer diameter of 0.433 inch. This results in an approximate mass of the bar 220 of 2.2 $lb_m$. These dimensions are exemplary to a particular missile configuration and are not limiting. The common outer diameters along the bar 220 facilitate manufacture, but are exemplary and not limiting. The bar 220 preferably possesses an axisymmetric cylindrical shape, but this design aspect is not limiting.

Exemplary embodiments for an explosive bolt 190 satisfy the specific objective of reducing restrained firing probability in the Mk41 Vertical Launching System with reduction in complexity and volume consumption as compared to the conventional solutions, such as utilizing two separate explosively releasable bolts.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. An explosive bolt for securing a brace in tension, said bolt comprising:
   a bar having opposing longitudinal ends and an outer thickness, opposing bores extending inwardly from said longitudinal ends to corresponding depth ends, first and second notches that reduce said thickness proximate to said corresponding depth ends, and a center rod that separates said notches;
   a pair of explosives, each explosive correspondingly inserts into a corresponding bore to a corresponding depth end;
   a pair of detonators, each detonator correspondingly inserts into said corresponding bore; and
   a pair of anchors, each anchor securing said bar to the brace.

2. The bolt according to claim 1, wherein said bar and said bores are axisymmetric.

3. The bolt according to claim 1, wherein each longitudinal end incorporates helical male threads, and each said anchor is a nut with corresponding helical female threads.

4. The bolt according to claim 1, wherein said bar is composed of stainless steel.

5. The bolt according to claim 1, wherein the brace retains a Marman band clamp.

6. The bolt according to claim 1, wherein said detonator is composed of lead azide.

7. The bolt according to claim 1, wherein said detonator is composed of lead syphnate.

8. A bar for an explosive bolt to sever a brace, said bolt including first and second explosives, first and second detonators and first and second helical female threads, said bar having an outer thickness and comprising:
   opposing longitudinal ends, each longitudinal end having helical male threads that attach to a corresponding nut;
   opposing bores extending inwardly from said longitudinal ends to corresponding depth ends for receiving the corresponding explosives and detonators;
   first and second notches that reduce said thickness proximate to said corresponding depth ends; and
   a center rod that separates said first and second notches.

9. The bar according to claim 8, wherein said rod, said bores and said longitudinal ends are axisymmetric.

10. The bar according to claim 8, wherein said bar is composed of stainless steel.

11. The bar according to claim 8, wherein said detonator is composed of pentaerthyritol tetranitrate.

12. The bar according to claim 8, wherein said charge is composed of cyclotrimethylenetrinitramine.

\* \* \* \* \*